United States Patent [19]

Schanze

[11] Patent Number: 5,795,104
[45] Date of Patent: Aug. 18, 1998

[54] WATERGLASS-BASED MATERIAL FOR SEALING PURPOSES AND PROCESSES FOR HARDENING WATERGLASS MATERIALS

[76] Inventor: Rudolf E. Schanze, Roermonder Strasse 111A, D-41379 Bruggen, Germany

[21] Appl. No.: 699,911

[22] Filed: Aug. 20, 1996

[30] Foreign Application Priority Data

Aug. 30, 1995 [EP] European Pat. Off. ............ 95113610

[51] Int. Cl.[6] .................. C09K 17/00; E02D 3/12
[52] U.S. Cl. ............... 405/263; 106/900; 405/150.1; 405/157
[58] Field of Search .................. 405/263, 258, 405/266, 267, 150.1, 157; 166/292, 293; 106/900, 811, 807, 806, 810

[56] References Cited

U.S. PATENT DOCUMENTS

| | | | |
|---|---|---|---|
| 4,311,409 | 1/1982 | Stang | 405/154 X |
| 4,318,835 | 3/1982 | Clarke | 405/154 X |
| 4,325,652 | 4/1982 | Kirschke | 405/154 X |
| 4,755,226 | 7/1988 | Friedemann et al. | 405/270 X |
| 4,988,238 | 1/1991 | Szekely et al. | 405/263 |
| 5,228,808 | 7/1993 | McKennon et al. | 405/263 |
| 5,285,000 | 2/1994 | Schwitzgebel | 405/263 X |
| 5,624,208 | 4/1997 | Kuegler | 405/263 |

FOREIGN PATENT DOCUMENTS

| | | |
|---|---|---|
| A-0 011 960 | 6/1980 | European Pat. Off. . |
| A-0 100 656 | 2/1984 | European Pat. Off. . |
| A-0 137 887 | 4/1985 | European Pat. Off. . |
| A2 151 648 | 4/1973 | France . |
| A-21 64 957 | 7/1973 | Germany . |
| A-52 123 508 | 10/1977 | Japan . |
| A-53 046 427 | 4/1978 | Japan . |
| A-55 133 481 | 10/1980 | Japan . |
| A-56 166288 | 12/1981 | Japan . |
| A-57 002 389 | 1/1982 | Japan . |

*Primary Examiner*—Dennis L. Taylor
*Attorney, Agent, or Firm*—Oliff & Berridge, PLC

[57] ABSTRACT

A waterglass-based material containing an inorganic component A of an alkali metal silicate having a low viscosity and a high silica content and a component B having at least one fast hardening agent, preferably carbonic esters, and a hardening retarder of at least one further hardening agent which acts more slowly, preferably dialkyl carboxylates, in particular dimethyl succinate, dimethyl glutarate and/or dimethyl adipate. The material may also contain optional further additives, such as liquefiers, thixotropic agents, lubricants and fillers and the like. Processes for hardening a waterglass-based material and use of such a material for sealing pipelines, sewers and containers, for soil stabilization, coating and impregnation of materials and for the production of shaped articles are also indicated.

41 Claims, No Drawings

WATERGLASS-BASED MATERIAL FOR SEALING PURPOSES AND PROCESSES FOR HARDENING WATERGLASS MATERIALS

BACKGROUND OF THE INVENTION

The invention relates to a waterglass-based material for sealing pipelines and containers, for soil stabilization and for coating or impregnating materials and articles and for the production of moldings, and processes for hardening a material based on waterglass and the use thereof.

Such a material for fixing dowel plugs and the like in cavities is described, for example, in European Patent Application EP 0 641 748 A1, which is hereby fully incorporated in the present disclosure by reference. Disadvantages of the material described there for use for sealing leaks in pipelines have proved to be the relatively long pot life of 15 minutes or more, the necessity for the presence of an additional, highly active reactant, such as fine-particled silica ($SiO_2$) or alumina ($Al_2O_3$) and of fillers, and the fact that different pot lives are complicated to obtain and cannot always be satisfactorily reproduced. Moreover, the ratio of $SiO_2$ to alkali metal oxide in the waterglass component, which is deliberately chosen to be low and is in the range from 1.4 to 2, is disadvantageous for applications according to the present invention, in particular for applications by a two-stage method.

EP 345 364 A1 describes a process for improving the strength and impermeability of soils and structures, including tanks and sewers, a waterglass-based material being used which contains about 5–50% by weight (dry substance) of a silica sol, dispersed in a medium which is at least partly (at least 10% by volume) organic, in addition to having high waterglass contents (about 15–40% by weight of dry substance). Esters, diacetals, amides and, for example, also propylene carbonate are mentioned as examples of the organic medium. The disadvantage of this invention is, inter alia, that it is by no means obvious to a person skilled in the art by which means a predictable change in the pot life can be achieved. Furthermore, the addition of silica sol is neither envisaged nor desired according to the present invention.

FR 1,600,298 discloses an improved waterglass-based composition for stabilizing sandy soils and rendering them impermeable to water. However, mixtures of a mineral acid, such as hydrochloric, sulfuric or phosphoric acid, and an organic reagent, such as formamide, isopropyl or isobutyl acetate or glycol monochlorohydrin, are used here as hardening agents. In view of the intended uses of the waterglass material and—according to the present invention—the optionally separate successive use of waterglass component and hardening agent, for example for sealing sewers and pipelines of concrete or cast iron, the use of such corrosive components is risky and therefore undesirable. Moreover, FR 1,600,298 discloses waterglass materials having long pot lives of from 12 minutes to more than 3 hours. According to the present invention, however, pot lives in the region of seconds are also desired and necessary. However, this teaching is not communicated in FR 1,600,298.

U.S. Pat. No. 4,056,937 describes an injection method for soil stabilization without contamination of the soil or the groundwater. This object is mainly achieved if—in contrast to the conventional application forms—the hardening component and/or a gelling modifier are initially taken and the waterglass component is then metered in. This prevents the pH from drifting into a strongly alkaline range. U.S. Pat. No. 4,056,937 furthermore indicates a bewildering number of examples in which gelling times in the range from seconds to hours are achieved. However, a major disadvantage for the applications according to the present invention is that the waterglass materials of U.S. Pat. No. 4,056,937 all have a water content of 80% by weight or more. Based on waterglass as dry substance, the water contents are 500–7300 parts by weight of water per 100 parts by weight of waterglass. Such a high water content would make the use for sealing leaks in pipelines virtually impossible or at least lead to a great loss of chemicals and at the same time considerable environmental pollution, since the low viscosity of the material is achieved by the high water content, which is expressly undesired and therefore avoided in the present invention.

SUMMARY OF THE INVENTION

These disadvantages of the known waterglass-based materials can now be successfully overcome by the various embodiments of the material according to the present invention.

By the choice of suitable molar ratios of silica to alkali metal oxide, the foundation for the subsequent processing, hardening and resistance properties is already laid, depending on the particular waterglass types used—sodium, potassium or lithium waterglass or a mixture thereof. The various waterglass types exhibit different behaviors. Whereas, for example, pure sodium waterglass begins to gel in a few seconds with one of the hardener mixtures according to the invention, this may take several minutes with the same hardener mixture in the case of potassium waterglass.

DETAILED DESCRIPTION OF PREFERRED EMBODIMENTS

The material according to the invention is essentially a two-component system consisting of a waterglass component A and a hardener component B. The component A contains a purely inorganic, alkaline waterglass having a molar $SiO_2$:alkali metal oxide ratio of 2.1–4. Pure sodium, potassium or lithium silicate or a mixture of two or all three components may be used; however, owing to the lower price, the more rapid hardening and the better processibility under the conditions of the present invention, sodium silicate is preferred. Also essential to the invention is the relatively low total water content of 10–60% by weight and the high content of silica in the range from 7 to 42% by weight, which gives the material according to the invention a characteristic tack in combination with good flow behavior, which is particularly advantageous especially in applications for sealing purposes. Depending on the composition and the associated intended use of the material, the silica content may vary within these limits, for example higher silica contents generally being advantageous for additive-free waterglass materials whereas the lower silica contents are generally sufficient for those materials which additionally contain relatively large amounts of, for example, fillers, lubricants and the like, in order to achieve the desired effect.

For some applications, however, it may also be necessary to make further adaptations to the silica content within the stated range. This may occasionally be required, for example, in applications where either dilution effects might occur through surrounding water or the two-component system is mixed prior to the actual application, for example for coating of materials, for the production of moldings or for soil stabilization.

The processing and use of the material is facilitated if the waterglass component (component A) is adjusted to a low viscosity in the range of 20–100 mPa.s (at 20° C.) and, for example, for use for sealing purposes, advantageously to about 40–60 mPa.s. Particularly in a two-stage application process, such low viscosities allow the A component to penetrate even into fine cracks and very small leaks.

Hardening at room temperature or in a processing range from −10° C. to +40° C., preferably +5° C. to +25° C., as is usually the case, for example, in applications for sewer sealing, can be achieved only by the use of hardening agents. The material according to the invention therefore contains, as component B, at least two different compounds acting as hardening agents, the type and amount of these hardening agents having a decisive effect on the product and processing qualities of the material. Their discovery after numerous—substantially empirical—experiments has considerably contributed toward the compositions, according to the invention, of the waterglass materials disclosed below.

It has been found that, for the intended applications, a mixture of at least one fast-acting hardening agent and at least one other, slower-acting hardening agent, which performs the function of a hardening retarder, leads to the best results. Here, fast hardening agents are understood as meaning those hardening agents which are capable of gelling waterglass within from about 5 to about 600 seconds, and slow hardening agents or hardening retarders are understood as meaning those which—when used alone—require more than 10 minutes for initiating the gelling process.

It is known that salts or esters which, under the strongly alkaline action of the waterglass, eliminate a stronger acid than the silica and precipitate colloidal silica with formation of their alkali metal salt lead to products having high strength. Some of these are also suitable as fast hardening agents for the present invention, especially the cyclic carbonic esters, such as, for example, ethylene carbonate, propylene carbonate and butylene carbonate (carbonic acid is a stronger acid than silica). They may be used individually or in different mixtures with one another and thus determine in particular the lower limit of the achievable reaction times until the onset of gelling, i.e. the shortest pot life or the fastest possible beginning of the hardening phase. In addition, however, they also influence or cause foam formation during processing or use of the material, so that this point too plays a not insignificant role in the choice of the fast hardening agent.

According to the present invention, however, lactones (e.g. γ-butyrolactone) and lactams (e.g. ε-caprolactam) whose parent structures are very similar to the carbonic esters, may also successfully be used as fast hardening agents in addition to the stated and other esters and salts, as can inorganic or organic acids, and anhydrides, nitriles, amides and acid chlorides.

What is important for the present invention is that the very short reaction times (in the range from about 10 seconds to a few minutes) until the onset of gelling, due to the action of the fast hardening agents, can be prolonged in a controlled and reproducible manner. This control of the reaction time is achieved primarily by the addition of at least one hardening retarder which slows down the action of the fast hardening agent.

In principle, the variation or establishment of a desired pot life can be achieved merely by the appropriate choice of the fast hardening agent and of the hardening retarder, but the defined change of the relative amounts or weight ratio of selected fast hardening agent and hardening retarder to one another gives better accuracy and reliability. Depending on the type of waterglass and on the chosen combination of the fast hardening agent and hardening retarder, the ratios to one another can be adjusted in the range from 1:0.05 to 1:50 (hardening agent: hardening retarder), in order thus to ensure the desired pot life.

More slowly reacting compounds from the same group from which the fast hardening agents also originate may be successfully used as suitable hardening retarders. However, the use of dialkyl esters of dicarboxylic acids, such as, for example, dimethyl succinate, dimethyl glutarate and/or dimethyl adipate, has proven particularly useful in many cases.

In addition to the main components waterglass, hardening agent and hardening retarder, the material according to the invention may also contain further components, such as, for example, liquefiers, thixotropic agents, lubricants, fillers, antifoams and the like.

Where very good flow properties of the waterglass-based material are required for the purpose of satisfactory processing, i.e. for example when sealing relatively small leaks, the composition of the material according to the invention should be chosen so that the B component, too, has an extremely low viscosity. In such cases, dynamic viscosities in the range of 1–10 mPa.s have proven advantageous for the B component, a viscosity of 4–6 mPa.s leading to the desired success for most mixtures, according to the invention, of hardening agent and hardening retarder.

It is of considerable advantage optimally to adjust the gelling time of the waterglass material to the particular case, for example in the region of seconds, and fillers may be undesirable.

Owing to their relatively well known reaction behavior and their ready availability, the cyclic carbonic esters, in particular ethylene carbonate, propylene carbonate and butylene carbonate, are the fast hardening agents of choice for many applications, and are used either individually or as a mixture of at least two of these carbonates. They are among the fastest acting hardening agents and are therefore present in compositions with a particularly short reaction time in substantially higher proportions than the hardening retarder or retarders.

According to a further embodiment of the present invention, a mixture which is also commercially available and comprises 15–25% by weight of dimethyl succinate, 55–65% by weight of dimethyl glutarate and 12–23% by weight of dimethyl adipate is used as the hardening retarder. This mixture of dialkyl carboxylates—referred to below as DAC mixture—has proved to be extremely advantageous in view of a very accurately adjustable pot life, in particular in combination with propylene carbonate as the sole fast hardening agent. Furthermore, the viscosity behavior and the substantially less foam formation compared with the use of ethylene carbonate can be readily mastered and controlled with the DAC mixture in combination with propylene carbonate.

In the majority of applications, a material according to the invention having a composition of about 90–350 parts by weight (pbw) of water and 15–125 pbw of hardening agent, including hardening retarder, based on 100 pbw of waterglass component (calculated as solids, i.e. dry substance), leads to the desired result. The best concentration ranges can preferably be limited to 150–230 pbw of water and 25–75 pbw of hardening agent/hardening retarder per 100 pbw of waterglass dry substance for one-stage applications.

It is also possible, and advantageous for some applications, for example in the case of relatively large building sites or because of the available equipment for processing the material according to the invention on site, to use the constituents of the B component, i.e. hardening agent and/or hardening retarder, not in liquid but in powder form or in pseudo-powdered form. For this purpose, liquid hardening agents and/or hardening retarders can be adsorbed onto a suitable carrier material, for example SIPERNAT® as colloidal silica. Of course, the amount of additionally introduced carrier material (dilution effect) must then be appropriately taken into account in selecting the concentration of hardening agent/hardening retarder. The ratio of carrier material to hardening agent and/or hardening retarder may be, for example, 50:50, so that twice the amount of powder then has to be used in order to obtain the desired amount of hardening agent/hardening retarder.

By increasing the solid content of the material and/or by increasing the proportion of DAC mixture relative to fast hardening agent, the viscosity of the mixture usually increases. In many cases, it may therefore be advantageous or even necessary to add a liquefier in order to ensure the initially mentioned viscosities and flow properties of the materials according to the invention. In addition, the liquefier ensures that the ratio of waterglass to filler(s) can be reduced; the higher filler content results in less shrinkage (which is advantageous especially in the sealing of relatively large leaks) and higher strength.

Conversely, it is in turn advantageous in other cases to stabilize, by means of a thixotropic agent, a material which has been adjusted to a very low viscosity to achieve the desired product properties, for the purpose of processing on site, for example in order to prevent flowing away or flowing back or dripping in the case of uneven surfaces. However, there are also applications where the simultaneous presence of liquefiers and thinners in the material is advantageous, for example in overhead work.

Depending on the application and desired content of further additives, liquefiers are advantageously used in amounts between 0 and 115 pbw, preferably about 10–60 pbw, and, if required, thixotropic agents in amounts between 0 and 115 pbw, preferably about 20–85 pbw, based on 100 pbw of waterglass (dry substance). If required, between 0 and 570 pbw of additives, such as antifoams, lubricants, colorants and/or fillers, may also be added.

For example, a silane emulsion which is also commercially available, such as, for example, the silane emulsion sold under the name WS 431 by Degussa, has proven useful as a liquefier (silicone emulsions are less advantageous; they have poor drying properties and reduce the adhesion); on the other hand, bentonite, preferably bentonite activated under alkaline conditions, has proved a particularly advantageous thixotropic agent for many cases; for example, the highly thixotropic gelling agent produced under the name OPTI-GEL® CK from Sud-Chemie AG, Munich, a white, free-flowing powder.

In a further embodiment, the material according to the invention also contains about 15–85, preferably about 40–60, pbw of a lubricant. Glycols or surfactants used to date (which also promote liquefaction or viscosity reduction) are disadvantageous because they impair the water resistance of the finished mixture. On the other hand, the addition of very finely disperse titanium dioxide has proven particularly expedient, possibly because of the titanates formed in the strongly alkaline medium. This addition facilitates, for example, the sliding of the material through the pipelines but also the pressing of the finished mixture out of mixing units, storage containers or cartridges.

In some cases, it is advantageous also to add one or more fillers to the material according to the invention, for example to achieve better strengths, for example for soil stabilization, in addition to a shorter reaction time or in order to achieve certain product properties for coating building materials, or to impart certain physical properties to moldings which can be produced from such materials, for example by conventional methods of plastics processing. Thus, the cavities formed in the waterglass material during extrusion or injection molding can be better filled, for example, by a mixture of relatively coarse quartz sand, for example of grain size 0.4 mm, and fine quartz powder (in particular quartz powder W6), so that compact, solid, essentially nonexpanded moldings can be produced. The amount of fillers is advantageously varied within a range of about 50–570 pbw, based on 100 pbw of waterglass dry substance.

It has also been found that the quartz sand usually used to date and having a grain size of, for example, 0.1–0.25 mm has too small a grain size and tends to shrink, whereas larger grains of 0.4 mm key better and therefore also increase the draw-out strength. However, even larger grains would once again be not so suitable because they might not fully guarantee complete filling of leaks.

The ratio of coarse-particled to fine-particled fillers should be tailored to the respective application and the waterglass type used. In the case of pure potassium waterglass, for example a ratio of 7:1 of quartz sand to quartz powder has proven advantageous for some applications, whereas the ratio of 7:5 has proven advantageous when a sodium/potassium waterglass is used.

The present invention relates to processes for the preparation and hardening of materials described herein. In principle, either the waterglass materials can be completely mixed together independently of the place of use and worked (e.g. shaped), processed or used in a suitable manner only thereafter, as a rule within the pot life (single-stage process), or the components of the two-component system are fed in separately from one another and reacted, usually directly at the place of use (two-stage process). The separate introduction of the waterglass component and of the hardener component may be effected simultaneously or in succession, preferably first the waterglass component and then the hardener component being added in the case of the successive introduction.

In the one-stage process, the waterglass component A, preferably pure sodium waterglass, having an $SiO_2$:alkali metal oxide molar ratio of 2.1–4 and preferably a viscosity (at 20° C.) of 20–100 mpa.s is initially taken, optionally with stirring and/or together with a liquefier and optionally with further additives, such as thixotropic agents, lubricants, fillers, antifoams and/or other additives; component B is subsequently added with at least one fast-acting organic hardening agent selected from the group consisting of the esters, lactones, lactams, inorganic or organic acids, anhydrides, nitrites, amides and acid chlorides, preferably at least one cyclic carbonic ester selected from the group consisting of ethylene carbonate, propylene carbonate and butylene carbonate; optionally—as part of the B component—at least one other, slow-acting hardening agent from the same group, preferably at least one dialkyl carboxylate, in particular dimethyl succinate, dimethyl glutarate and/or dimethyl adipate, is furthermore added to the fast hardening agent as a hardening retarder, optionally under slight superatmospheric pressure and/or with relatively vigorous stirring, so that a total water content of 10–60% by weight and a silica content of 7–42, preferably 12–24%, by weight results and the mass begins to gel spontaneously within a reaction time (pot life) typical of its composition and the chosen reaction conditions—in particular reaction temperature—and then hardened.

In the two-stage process, stirring can generally be dispensed with completely and instead component A, optionally together with the stated additives, can be initially taken under slightly superatmospheric pressure, for example in a pipeline to be renovated, in an oil or water tank or in many soil stabilization applications. The B component, i.e. hardening agent and optionally hardening retarder, is then added in the same manner, preferably once again under slightly superatmospheric pressure, in order thus to permit the best possible penetration of the A and B components and to achieve stable and permanent sealing of the leak or stabilization of the consolidated soil.

It has surprisingly been found that hardening of the uppermost layer does not take place immediately as a result of the contact of the B component with the initially taken A component, which might prevent penetration of the hardening agent into deeper layers, but that the hardener components evidently "creep after" the waterglass and thus permit the desired action at a depth and stable sealing of the leak or soil stabilization.

A special embodiment of the process according to the invention for the preparation and hardening of the waterglass material, in particular for sealing purposes in leaking sewer pipes or other pipelines, pipeline connections and leaking containers, in particular those which are in direct contact with the soil or masonry, comprises introducing the component A—optionally together with a liquefier and/or further additives, such as thixotropic agents, lubricants, fillers and/or other additives—under a superatmospheric pressure of 0.5–2 m water column into the pipeline, the sewer or the container, preferably in a blocked-off region thereof;

removing excess material after a desired waiting time;

flushing the pipeline or the sewer with water to remove undesired residues of the A component from the inner surfaces of the pipeline, of the sewer or of the container;

but in many cases introducing the component B, i.e. hardening agent and optionally hardening retarder, depending on the given situation and need, under a superatmospheric pressure of 0.5–2 m water column into the pipeline or the sewer and removing excess material after a desired waiting time, so that the material gels spontaneously within a reaction time (pot life) typical of the composition of the material and the chosen reaction conditions and hardens and the leak is sealed permanently and in such a way that it is chemically resistant.

By means of this two-stage process for sealing leaks, either undesired emergence of liquid from the pipe, the sewer or the container into the environment or, conversely, penetration of liquid from the environment into a leaking pipe or a container is effectively and permanently prevented. This process can be preferably used wherever all systems known to date cannot be used, in particular in pipes having nominal diameters of less than about 150 mm (<ND 150), in bends, under factory halls, in the house drainage sector and the like. It is thus possible to seal all known pipe materials, such as, for example, stoneware, concrete, fiber cement, PVC, cast iron, etc. This process is particularly suitable for sealing longitudinal and radial cracks, for filling leaking pipe connections (e.g. sleeves), where seals are missing and for similar leaks in pipe systems. The sealing material remains flexible within certain limits even after hardening, so that relatively small mechanical tensile and/or compressive loads and vibrations do not damage the seal.

This process can be successfully used in an analogous manner also for renovating leaking containers, for example boilers and tanks, which come into direct or indirect contact with soil or masonry or are even partly or wholly embedded therein (e.g. oil tanks, water tanks, other liquid containers and optionally gas containers), well shafts, swimming pools, garden ponds and the like.

By reducing the water content relative to the solids and/or by increasing the concentration of hardening agent and hardening retarder and by increasing the temperature, the reaction time to the beginning of gelling can be shortened. Such measures may be very advantageous, for example, for sealing processes which must be completed very rapidly. Optionally, considerable evolution of heat may take place even as a result of the chemical reactions on mixing together the A and the B components, thus further accelerating the reaction.

A further possibility for varying, for example shortening, the pot life—which is applied in the majority of cases—comprises—as already mentioned further above—changing, for example reducing, the ratio of hardening retarder to fast hardening agent. The advantage of this method consists primarily in the reliability of adjustment of the pot life owing to a clearly comprehensible and clearly defined variation of virtually only one parameter, namely the ratio of hardening agent to hardening retarder. A combination of the various possibilities (e.g. temperature, concentration of hardening agent, total solids content, water content, ratio of hardening agent to hardening retarder) may under certain circumstances lead to a deterioration in the reproducibility of the process.

In one of the possible embodiments of the one-stage or two-stage process, the hardening agent/hardening retarder component is used not in liquid form but in powder form. This may be a mixture of a suitable carrier with the respective hardening agent and/or hardening retarder, SIPERNAT® having proven useful as a carrier in a 50:50% by weight mixture with the hardening agent/hardening retarder.

In a further embodiment, the process relates to the preparation of a material which—based on 100 pbw of waterglass (as dry substance)—contains 150–230 pbw, in particular about 185 pbw, of water and 25–60 pbw, in particular about 32 pbw, of hardening agent including hardening retarder, the reaction time being controlled within a range from a few seconds to more than one hour by varying the ratios of hardening agent(s) and hardening retarder(s).

The invention is furthermore applicable to the use of the materials described herein for purposes over and above the sealing of leaks which is described above. For example, one or more of the materials disclosed explicitly or implicitly herein can be used to effect chemically resistant soil stabilization in an environmentally compatible manner, in particular for the areas of civil engineering, tunnel construction, mines (coal, salt), landfill sealing and dyke stabilization.

In addition, one or more of the disclosed materials can be used successfully and without problems for coating and/or impregnating articles and materials, preferably concrete, masonry, wood, plaster, natural or synthetic fabrics, insulating panels and the like. As a result, not only can the physical strength parameters of some of the materials treated be improved but in particular also their chemical load capacity or resistance. Their fireproof properties can also be decisively improved thereby, which is particularly advantageous especially in the building construction sector.

The same applies to the case where one or more of the materials according to the invention are used for reinforcing foamed structural parts by impregnation, preferably by immersion of the structural parts in the material in particular in combination with a vacuum method.

Finally, one or more of the materials according to the invention can also be used for the production of fireproof cements and fireproof adhesives.

However, it is also possible to use one or more of the materials according to the invention for the production of cast, compression molded, extruded and/or injection molded articles in solid, nonexpanded or in foamed, expanded form. Such articles can be obtained by conventional processes, such as compression molding, casting, blow molding, extrusion, injection molding or the like. All of them are distinguished by particular chemical resistance and—in addition to their suitability as, for example, filling material in packagings—can therefore be produced and used in particular for applications in the open air (e.g. protective covers, grave lights, vessels, decorative articles, etc.) or in chemical plants as, for example, packings which increase the surface area.

The invention is further explained below with reference to examples. The explanations serve exclusively for better comprehension of the invention and do not in any way imply a restriction of the invention to the Examples mentioned.

Example 1: Basic composition of waterglass-based materials according to the invention Table 1 below shows an example of successfully usable compositions of the material according to the invention:

TABLE 1

| General % by wt. | For sealing purposes preferably % by wt. | MATERIAL |
|---|---|---|
| 30–95 | 75–90 | Sodium waterglass (26.8% by weight $SiO_2$ + 8.2% $Na_2O$ = 35% solid; 65% water) |
| 0–12 | 0–6 | Liquefier, e.g. silane emulsion (WS 431, Degussa) |
| 5–20 | 10–20 | Propylene carbonate (fast hardening agent) + optionally ethylene carbonate (fast hardening agent) + DAC mixture (hardening retarder) |
| 0–12 | 0 | Thixotropic agent, e.g. bentonite (OPTIGEL® CK from Süd-Chemie) |
| 0–60 | 0–2 | Fillers, e.g. quartz sand, quartz powder + other additives, e.g. antifoams, lubricants, colorants |
| 100.0 | 100.0 | |

For intended uses as a type of waterglass mortar in a one-stage application process (e.g. impregnation of materials, coating of articles and materials, imparting rigidity to building constructions, sealing cracks, holes and leaking pipe connections from the outside, production of shaped articles, etc.), the material according to the invention can be prepared as follows:

The component A (waterglass) is initially taken, optionally together with the liquefier (e.g. silane emulsion WS 431). Thereafter—if required—bentonite and then the component B, i.e. the hardening agent (e.g. propylene carbonate, optionally as a mixture with ethylene carbonate) together with the hardening retarder (e.g. DAC mixture) are incorporated with vigorous stirring. If necessary, a suitable antifoam may also be admixed. In some cases, it may be advantageous also to mix colorant with the A component, for example to achieve special effects in the case of coatings or in the production of shaped articles. The preparation is carried out as a rule at room temperature. A temperature increase of not more than 40°–50° C. may occur in the system owing to the exothermic reaction.

The material can then be processed within its pot life and can be applied or shaped (for example by casting, compression molding, extrusion, injection molding, etc.) for the above-mentioned purposes. The material according to the invention is advantageously distinguished, inter alia, by the following product properties: it has little shrinkage and is heat-resistant to 900° C., nonflammable, water- and acid-resistant and alkali-resistant. Particularly in the case of continuous contact with moisture after hardening of the material, a certain residual flexibility is also retained, so that the material is capable by itself of filling fine cracks which may form as a result of pressure and/or tensile load.

The simultaneous use of a thixotropic agent (e.g. bentonite) and of a liquefier (e.g. silane emulsion), proposed according to this embodiment, also helps to achieve the above properties but is particularly advantageous during processing, for example in overhead work.

The low-additive or completely additive-free waterglass materials of the second column of Table 1 are also very suitable for use in two-stage processes, in particular for sealing leaks in sewers and other pipelines and for soil stabilization. The omission of stirring processes usually makes the use of antifoams unnecessary. The addition of fillers can in many cases be a hindrance in the sealing of small leaks since they may impede complete filling of the leak by the waterglass sealing material. On the other hand, in the case of surrounding soil or masonry, there is generally sufficient filling material present outside the sewer or the pipeline so that, on passing through the leak orifice, the sealing material thus comes into contact therewith, hardens rapidly and forms a sealing bead around the orifice from the outside, with the result that further unnecessary passage of the chemicals of the sealing material to the outside is prevented.

By varying the ingredients of the hardener system (B component), pot lives of between 10 seconds and more than one hour can be obtained, depending on the intended use. In this context, also see Table 2.

Example 2: Variation of the hardening agent/hardening retarder ratio

The material used in this embodiment is composed of: 31.5% by weight of waterglass dry substance (including 26.8% by weight of silica), 58.5% by weight of water and 10% by weight of hardening agent/hardening retarder. The mixtures shown in Table 2 and comprising hardening agent and hardening retarder gave, at 20° C., reaction times (pot lives) of between a few seconds and more than one hour up to the start of gelling.

TABLE 2

| Fast HARDENING AGENT/ HARDENING RETARDER | POT LIFE or START OF GELLING |
|---|---|
| 70% of ethylene carbonate 30% of propylene carbonate | <15 sec. |
| 50% of ethylene carbonate 50% of propylene carbonate | 15 sec. |
| 100% of propylene carbonate | 30 sec. |
| 50% of propylene carbonate 50% of DAC mixture | 2 min. |
| 25% of propylene carbonate 75% of DAC mixture | 7 min. |
| 20% of propylene carbonate 80% of DAC mixture | 10 min. |
| 10% of propylene carbonate 90% of DAC mixture | 15 min. |
| 5% of propylene carbonate 95% of DAC mixture | 30 min. |

TABLE 2-continued

| Fast HARDENING AGENT/ HARDENING RETARDER | POT LIFE or START OF GELLING |
|---|---|
| 100% of DAC mixture | 60–90 min. |

Example 3: Process for sealing a leak

Individual components (as in Example 1):

Component A, the actual carrier of the system, is especially formulated, purely inorganic sodium silicate having a high silica content (26.8% by weight) and a low viscosity (about 50 mpa.s at T=20° C.); the high silica content makes the product very tacky—if the temperature is not too low, the material nevertheless remains very free-flowing or retains its very good creep properties.

Component B, the hardening agent consisting of 90% by weight of fast propylene carbonate hardening agent and 10% by weight of slow hardening retarder (DAC mixture as in Examples 1 and 2), has a low viscosity (about 5 mPa.s/20° C.) and, with the correct temperature, is adjusted to the silicate to give fast creep properties. When components A and B are combined, the system polymerizes within about 30 seconds; at temperatures above +20° C., the reaction is even faster—temperatures down to below +10° C. make the system correspondingly slower.

Mode of action:

The component A is a silicate which is very suitable for sealing sewers. When the leaking sewer section is flooded, the material is not lost like water in the soil but, owing to its high tack, remains adhering to the outside of the leak and fills leaking sleeves and/or cavities in the soil. At the same time, however, the silicate is very free-flowing and has good creep properties and is therefore also suitable for filling fine hairline cracks.

Under the action of a slight, hydrostatic superatmospheric pressure of about 0.5 to 2 m water column, the silicate forms a uniform cushion around the leak. To achieve the best results, it is preferable to ensure that the component A remains flooded for long enough during the first flooding operation so that the impregnated area around the leak is large or deep enough to take up the hardening agent (component B) as completely as possible and also to achieve the secondary effect of binding contaminated soil. With declining hydrostatic pressure or after the hydrostatic pressure has been eliminated, the component A (waterglass) remains (adheres in the soil) and is ready to take up the subsequent hardening agent (component B).

The mixture of fast hardening agent and hardening retarder (component B) is adjusted to an extremely low viscosity (about 5 mPa.s at 20° C.) and penetrates the waterglass directly without pushing the material in front of it; the fast hardening agent makes this composition of the material according to the invention into a "high-speed system"—it reacts virtually immediately.

The actual sealing takes place with pure, reacted silicate gel, which is present in the leaks or directly around the stabilized layer around the pipe. The tack of the waterglass component results in a stabilized layer around the pipe which, in the form of hardened silica gel, forms a solid sheath which, depending on the size of the leak, is from several millimeters to centimeters thick. The conglomerate of soil/sand/gravel present serves as an abutment for the sealing material in the leaks and the sheath.

As a result of the constantly present soil moisture or the moisture in the pipes, the system may under favorable conditions continue to have limited reactivity, i.e. any hairline cracks which occur as a result of vibration could be filled in a self-healing manner by escape of the flexible gel-like sealing material. Tests have shown again and again that solidified material in cracks and newly filled sleeves could not be caused to leak by simple methods and also remained intact when subjected to small vibrations.

The "fast-acting system" requires about 30 seconds before the beginning of the sealing process in a pipe. During this time, up to about 20% of hardening agent penetrates into the A component—i.e. up to 10% more than the system requires for hardening. If a second flooding process is required, the excess is immediately used for reaction by the A component. As a rule, there is therefore often no further consumption during the second flooding of the hardening agent.

The fact that the system requires more than one flooding attempt in the case of relatively large leaks is because aqueous systems shrink. If such systems are filled, for example with sand or other solids, the shrinkage is reduced to a minimum.

Since no fillers are present in the leaks, the silicate gel shrinks after about 5–10 minutes, depending on the material temperatures.

Depending on the size of the leak, a second flooding process may be necessary, which then, however, completely seals the pipe since only the shrinkage crack now has to be filled.

The system is extremely resistant to leaching or chemical decomposition and is, for example, also resistant to sulfuric acid.

I claim:

1. A waterglass-based material comprising components A and B and optionally further additives, wherein:
   a) component A comprises alkali silicate waterglass having an $SiO_2$:alkali metal silicate molar ratio of 2.1–4; and
   b) component B comprises at least one fast-acting hardening agent selected from the group consisting of esters, lactones, lactams, inorganic or organic acids, anhydrides, nitrites, amides and acid chlorides, and additionally,
   as a hardening retarder, at least one other hardening agent which acts more slowly than the fast-acting hardening agent and is selected from the group consisting of butylene carbonate and a mixture of different dialkyl carboxylates selected from the group consisting of dimethyl succinate, dimethyl glutarate and dimethyl adipate;
   wherein the waterglass-based material has a total water content of 10–60% by weight, and wherein the waterglass-based material has a silica content of 7–42% by weight.

2. A material as claimed in claim 1, wherein the component A has a viscosity of 20–100 mpa.s, and the component B has a viscosity of 1–10 mpa.s, at 20° C.

3. A material as claimed in claim 1, wherein the fast-acting hardening agent and the hardening retarder are present in a weight ratio of from 1:0.05 to 1:50.

4. A material as claimed in claim 1, wherein the hardening retarder is a mixture of 15–25% by weight of dimethyl succinate, 55–65% by weight of dimethyl glutarate and 12–23% by weight of dimethyl adipate.

5. A material as claimed in claim 1, which contains—based on 100 parts by weight of waterglass (calculated as dry substance)—90–350 parts by weight of water and 15–125 parts by weight total of the fast-acting hardening agent and the hardening retarder.

6. A material as claimed in claim 1, wherein, in component B, the fast-acting hardening agent or the hardening retarder or both are present in powder form.

7. A material as claimed in claim 6, wherein the fast-acting hardening agent or the hardening retarder or both are present adsorbed on a suitable carrier.

8. A material as claimed in claim 6, wherein the weight ratio of carrier and adsorbed agents is 50:50.

9. A material as claimed in claim 1, which furthermore contains—based on 100 parts by weight of waterglass (as dry substance)—between 0 and 115 parts by weight of a liquefier, 0 to 115 parts by weight of a thixotropic agent, and 0 to 570 parts by weight of further additives.

10. A material as claimed in claim 1, which furthermore contains, based on 100 parts by weight of waterglass (as dry substance), about 15–85 parts by weight of a lubricant.

11. A material as claimed in claim 1, which furthermore contains at least one filler selected from the group consisting of quartz sand and quartz powder.

12. A process for the preparation and hardening of a waterglass-based material, wherein
  a) waterglass having an $SiO_2$:alkali metal oxide molar ratio of from 2.1 to 4 and a viscosity (at 20° C.) of 20–100 mPa.s is initially provided as component A, and
  b) then component B is added which comprises at least one fast-acting hardening agent selected from the group consisting of esters, lactones, lactams, inorganic or organic acids, anhydrides, nitrites, amides and acid chlorides, and at least one other hardening agent as a hardening retarder which acts more slowly that the fast-acting hardening agent and is selected from the group consisting of butylene carbonate and a mixture of different dialkyl carboxylates selected from the group consisting of dimethyl succinate, dimethyl glutarate and dimethyl adipate, so that a total water content of 10–60% by weight and a silica content of 7–42% by weight result and the material gels spontaneously within a reaction time (pot life) typical of the composition of the material and the chosen reaction conditions, and hardens.

13. A process as claimed in claim 12, suitable for sealing leaks in pipelines, sewers and containers, wherein
  i) the waterglass component A is introduced under a superatmospheric pressure of 0.5–2 m water column into the pipeline, the sewer or the container;
  ii) excess material is removed after a desired waiting time;
  iii) the pipeline, sewer or container is flushed with water to remove undesired residues of component A from inner surfaces of the pipeline, the sewer or the container; whereupon
  iv) the at least one fast-acting hardening agent of component B is introduced into the pipeline, the sewer or the container in combination with the hardening retarder, under a superatmospheric pressure of 0.5–2 m water column;
  v) excess material is removed after a desired waiting time, and
  vi) the steps i) and iii) or i) and v) are repeated if necessary, so that material gels spontaneously within a reaction time (pot life) typical of the composition of the material and the chosen reaction conditions and hardens and the leak is permanently sealed in a chemically resistant manner.

14. A process as claimed in claim 12, wherein the fast-acting hardening agent, the hardening retarder or both are added in powder form.

15. A process as claimed in claim 12, wherein, for a given ratio of hardening agent to hardening retarder, the reaction time is reduced by at least one measure selected from the group consisting of reducing the amount of water, increasing the concentration of the fast- acting hardening agent and the hardening retarder, and increasing the temperature.

16. A process as claimed in claim 12, wherein the material contains, based on 100 parts by weight, of waterglass (as dry substance), 150–230 parts by weight of water and 25–75 parts by weight total of the fast-acting hardening agent and the hardening retarder, and the reaction time is controlled within the range from a few seconds to more than one hour by varying the ratios of fast-acting hardening agent(s) and hardening retarder(s).

17. A material as claimed in claim 1, wherein said material is a sealant for sealing, permanently and in a chemically resistant manner, leaking pipelines and sewers as well as containers comprising boilers, tanks, well shafts, swimming pools and garden ponds, to prevent water penetration or emergence of liquid into the environment.

18. A material as claimed in claim 1, wherein said waterglass-based material is for environmentally compatible and chemically resistant soil stabilization for various areas comprising the areas of civil engineering, tunnel construction, mines (coal, salt), landfill sealing and dike stabilization.

19. A method of coating or impregnating articles or other materials of various origin or structure, comprising concrete, masonry, wood, plaster, natural or synthetic fabrics, or insulating panels, wherein the method comprises: coating and/or impregnating the articles or other materials with the waterglass-based material as claimed in claim 1.

20. A method of reinforcing foamed structural parts by impregnation, comprising immersion of the structural parts in the material of claim 1, in combination with vacuum methods.

21. A material as claimed in claim 1, wherein said waterglass-based material is part of a fireproof cement or adhesive.

22. A cast, extruded or injection molded article in solid, nonexpanded or in foamed, expanded form comprised of the waterglass-based material as claimed in claim 1.

23. A material as claimed in claim 1, wherein the alkali metal silicate waterglass in component A is pure sodium waterglass.

24. A material as claimed in claim 1, wherein the fast-acting organic hardening agent in component B is a cyclic carbonic ester selected from the group consisting of ethylene carbonate, propylene carbonate and butylene carbonate.

25. A material as claimed in claim 1, wherein the silica content is 12–24% by weight.

26. A material as claimed in claim 2, wherein the component A has a viscosity of 40–60 mPa.s and the component B has a viscosity of 4–6 mPa.s, at 20° C.

27. A material as claimed in claim 5, which contains— based on 100 parts by weight of waterglass (calculated as dry substance)—150–230 parts by weight of water and 25–75 parts by weight total of the fast-acting hardening agent and the hardening retarder.

28. A material as claimed in claim 7, wherein the carrier is colloidal silica.

29. A material as claimed in claim 9, which contains— based on 100 parts by weight of waterglass (as dry substance)—10–60 parts by weight of a silane emulsion as a liquefier, and wherein the further additives comprise at least one component selected from the group consisting of antifoams, lubricants, colorants, and fillers.

30. A material as claimed in claim 9, which contains— based on 100parts by weight of waterglass (as dry substance)

—20–85 parts by weight of a bentonite activated by means of an alkali as a thixotropic agent, and wherein the further additives comprise at least one component selected from the group consisting of antifoams, lubricants, colorants, and fillers.

31. A material as claimed in claim 10, which contains, based on 100 parts by weight of waterglass (as dry substance), 40 to 60 parts by weight of very finely divided $TiO_2$ as a lubricant.

32. A material as claimed in claim 11, wherein the filler is a mixture of quartz sand and quartz powder in a ratio of 7:1 when used in combination with pure potassium waterglass in component A, or in a ratio of 7:5 when used in combination with sodium potassium waterglass in component A.

33. A process as claimed in claim 12, wherein the waterglass in component A is pure sodium waterglass having a viscosity (at 20° C.) of 40–60 mPa.s.

34. A process as claimed in claim 12, wherein component A is provided in combination with further additives comprising at least one component selected from the group consisting of liquefiers, thixotropic agents, lubricants, fillers, and antifoams.

35. A process as claimed in claim 12, wherein component A is provided at a slightly superatmospheric pressure or with stirring, or both.

36. A process as claimed in claim 12, wherein the fast-acting organic hardening agent is selected from the group consisting of ethylene carbonate, propylene carbonate and butylene carbonate.

37. A process as claimed in claim 12, wherein the hardening retarder is a mixture of 15–25% by weight of dimethyl succinate, 55–65% by weight of dimethyl glutarate and 12–23% by weight of dimethyl adipate.

38. A process as claimed in claim 12, wherein the fast-acting organic hardening agent and the hardening retarder are added at slightly superatmospheric pressure or with relatively vigorous stirring, or both.

39. A process as claimed in claim 12, wherein the silica content of the waterglass-based material resulting after step (b) is 12–24% by weight.

40. A process as claimed in claim 14, wherein the fast-acting hardening agent, the hardening retarder, or both are applied as a 50:50% by weight mixture with colloidal silica as a carrier.

41. A process as claimed in claim 16, wherein the material contains, based on 100 parts by weight, of waterglass (as dry substance), about 185 parts by weight of water and about 32 parts by weight total of the fast-acting hardening agent and the hardening retarder.

* * * * *